US008280205B2

(12) United States Patent
Erdman et al.

(10) Patent No.: US 8,280,205 B2
(45) Date of Patent: Oct. 2, 2012

(54) FIBER OPTIC CONNECTOR AND ALIGNMENT MECHANISM FOR SINGLE LENS MULTI-FIBER CONNECTOR

(75) Inventors: David Donald Erdman, Hummelstown, PA (US); Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 213 days.

(21) Appl. No.: 12/842,696

(22) Filed: Jul. 23, 2010

(65) Prior Publication Data

US 2012/0020618 A1    Jan. 26, 2012

(51) Int. Cl.
*G02B 6/26* (2006.01)
*G02B 27/30* (2006.01)

(52) U.S. Cl. ............... 385/15; 385/25; 385/26; 385/33; 385/50; 385/52; 385/53; 385/54; 385/55; 385/56; 385/59; 385/71; 385/74; 385/84; 385/93; 359/641; 359/642

(58) Field of Classification Search ..................... 385/15, 385/25–26, 33, 50, 52–56, 59, 71, 74, 84, 385/93; 359/641–642
See application file for complete search history.

(56) References Cited

U.S. PATENT DOCUMENTS

| | | | | |
|---|---|---|---|---|
| 4,204,310 | A * | 5/1980 | Auracher et al. | 29/445 |
| 4,730,891 | A * | 3/1988 | Poorman | 385/74 |
| 5,247,595 | A | 9/1993 | Foldi | |
| 5,684,644 | A * | 11/1997 | Spears et al. | 359/823 |
| 5,778,124 | A | 7/1998 | Nedstedt | |
| 6,736,550 | B1 * | 5/2004 | Wang et al. | 385/79 |
| 6,764,224 | B2 * | 7/2004 | Brun et al. | 385/84 |
| 7,016,565 | B2 * | 3/2006 | Hsia et al. | 385/34 |
| 7,422,375 | B2 * | 9/2008 | Suzuki et al. | 385/58 |
| 7,559,705 | B2 * | 7/2009 | Vanniasinkam et al. | 385/93 |
| 2004/0109646 | A1 | 6/2004 | Anderson et al. | |
| 2005/0013542 | A1 * | 1/2005 | Blasingame et al. | 385/38 |

* cited by examiner

FOREIGN PATENT DOCUMENTS

| | | |
|---|---|---|
| DE | 199 01 186 A1 | 7/1999 |
| EP | 1 043 611 A2 | 10/2000 |
| EP | 1 271 192 A1 | 1/2003 |

OTHER PUBLICATIONS

International Search Report, International Application No. PCT/US2011/001284, International Filing Date Jul. 20, 2011. "Fiber Optic Solutions for Rugged Applications", Tyco Electronics literature 9-1773456.9; Mar. 2010.

*Primary Examiner* — Brian M. Healy
*Assistant Examiner* — Guy Anderson (57) ABSTRACT

The invention pertains to an optical connector assembly having an alignment mechanism for coupling two single-lens, multi-fiber optical connectors together. Particularly, each connector comprising a single lens through which the light from multiple fibers is expanded/focused for coupling to corresponding fibers in a mating connector. In one aspect of the invention, the alignment mechanism includes mating features extending from the fronts of the lenses having substantially longitudinal surfaces that meet and contact each other when the two connectors are coupled together in only one or a limited number of rotational orientations relative to each other to as to properly rotationally align the multiple fibers in the two mating connectors. This mechanism also helps align the two connectors with the optical axes of their lenses parallel to each other. In another aspect of the invention to even more effectively align the two connectors with their optical axes parallel to each other, the connector assembly includes an alignment sleeve into which the front of each lens extends when mated, an inner diametrical surface of the alignment sleeve contacting an outer diametrical surface of each of the two lenses over a substantial longitudinal portion of each lens. The alignment sleeve may, for instance, be a resilient split sleeve that expands radially to accept the lenses.

20 Claims, 6 Drawing Sheets

FIBER OPTIC CONNECTOR AND ALIGNMENT MECHANISM FOR SINGLE LENS MULTI-FIBER CONNECTOR

FIELD OF TECHNOLOGY

The invention pertains to optoelectronics. More particularly, the invention pertains to a method and apparatus for aligning two single lens, multi-fiber connectors.

BACKGROUND

It is typically the case that an optical signal transported over an optical fiber must be coupled between that optical fiber and another optical fiber or an optoelectronic device. Typically, the end of the optical fiber is outfitted with an optical connector of a given form factor, which connector can be coupled to a mating optical connector on the other fiber (or optoelectronic device).

Optical cables that are connected to each other through a pair of mating connectors may comprise a single optical fiber. However, more and more commonly, optical cables contain a plurality of optical fibers and the light in each optical fiber in the cable is coupled through a pair of mating connectors to a corresponding optical fiber in another cable.

Optical connectors generally must be fabricated extremely precisely to ensure that as much light as possible is transmitted through the mating connectors so as to minimize signal loss during transmission. In a typical optical fiber, the light is generally contained only within the core of the fiber, which typically may be about 10 microns in diameter for a single-mode fiber or about 50 microns in diameter for a multi-mode fiber. Accordingly, lateral alignment of the fibers in one connector with the fibers in the other connector must be very precise. Also, a speck of dust typically is greater than 10 microns in cross section. Accordingly, a single speck of dust at the interface of two connectors can substantially or even fully block the optical signal in a fiber from getting through the connectors.

Accordingly, it is well known to use expanded beam connectors in situations where it is likely that connections will be made in the field, and particularly in rugged or dusty environments. Expanded beam connectors include optics (e.g., lenses) that expand the beam so as to increase the beam's cross section at the optical interface of the connector (i.e., the end of the connector that is designed to be connected to another optical connector or optoelectronic device). Depending, of course, on the direction of light travel through the connector, the lens either expands a beam exiting a fiber to a greater cross section for coupling to the corresponding lens of a mating connector or focuses a beam entering the lens from a corresponding lens of another connector to a focal point on the face of a fiber.

SUMMARY

The invention pertains to an optical connector assembly having an alignment mechanism for coupling two single-lens, multi-fiber optical connectors together. Particularly, each connector comprising a single lens through which the light from multiple fibers is expanded/focused for coupling to corresponding fibers in a mating connector. In one aspect of the invention, the alignment mechanism includes mating features extending from the fronts of the lenses having substantially longitudinal surfaces that can meet and contact each other when the two connectors are coupled together in only one or a limited number of rotational orientations relative to each other so as to properly rotationally align the lenses in the two mating connectors. This mechanism also helps axially align the two lenses.

In another aspect of the invention to even more effectively axially align the two connectors, the connector assembly includes an alignment sleeve into which the front of each lens extends when mated, an inner diametrical surface of the alignment sleeve contacting an outer diametrical surface of each of the two lenses over a substantial longitudinal portion of each lens. The alignment sleeve may, for instance, be a resilient split sleeve that expands radially to accept the lenses.

DETAILED DESCRIPTION OF EMBODIMENTS

Conventionally, an optical connector employing an expanded beam coupling includes a separate lens for each fiber. In some expanded beam optical connectors, for instance, each optical fiber of a fiber optic cable is separated from the other fibers and inserted into a separate ferrule in a ferrule assembly of the connector, each ferrule precisely aligning its fiber laterally (i.e., transverse the optical axis of the fiber) in the connector for optical coupling to the corresponding fiber in a mating connector. A lens is disposed at the front end of each ferrule for expanding and collimating the beam exiting the fiber (or focusing a beam on the front face of the fiber, in the case of light traveling in the other direction into the fiber from the corresponding fiber of a mating connector).

Figure 1:
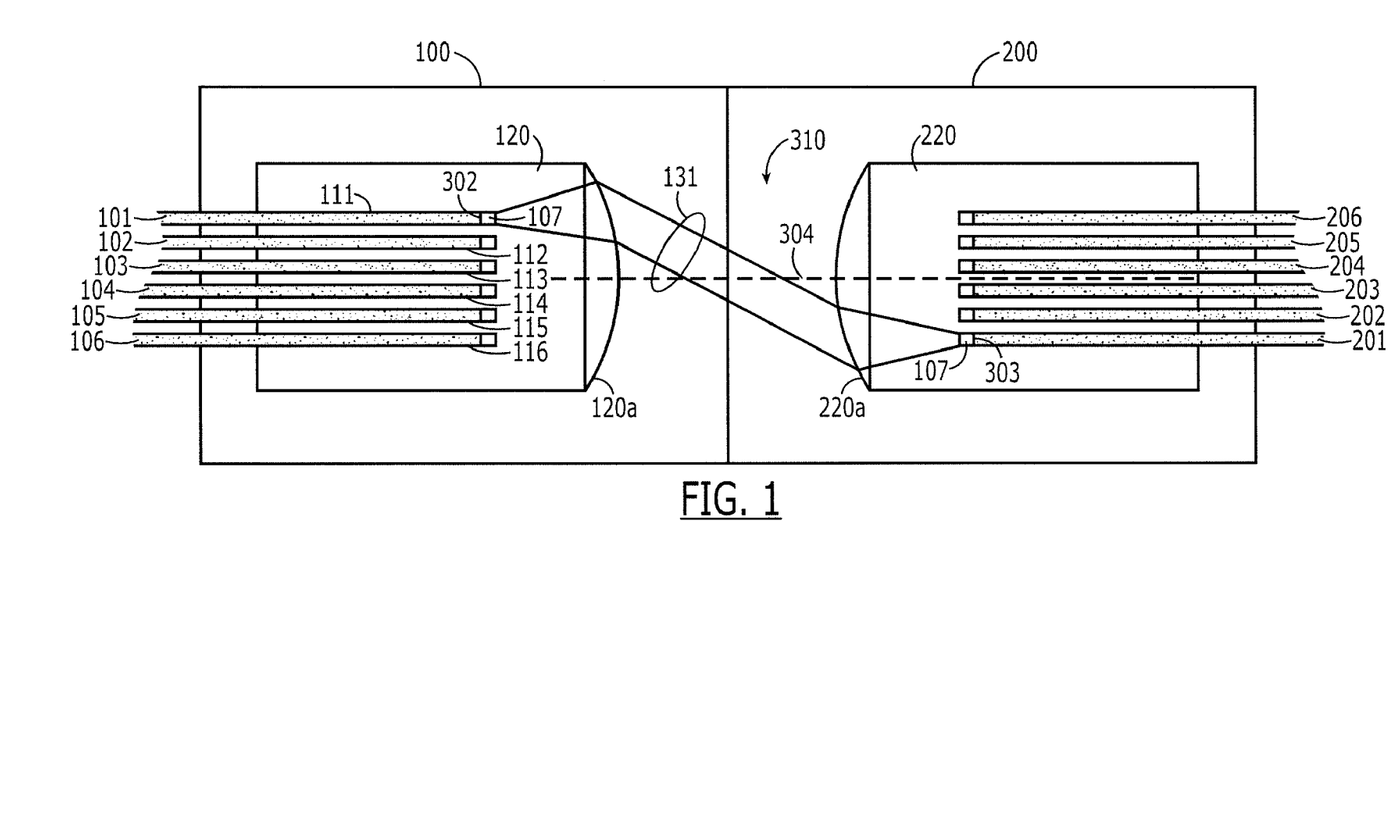
FIG. 1 is a schematic diagram of two mating optical connectors employing a single lens per connector for coupling light between multiple fibers in each connector illustrating the coupling of light between one pair of corresponding fibers in the two connectors.

FIG. 1 illustrates a connector system as disclosed in U.S. patent application Ser. No. 12/836,067 entitled SINGLE LENS, MULTI-FIBER OPTICAL CONNECTION METHOD AND APPARATUS filed on Jul. 14, 2010, which is incorporated herein fully by reference. In this connector system, a single lens per connector expands, collimates, and images the light beams from multiple fibers in that connector to corresponding fibers in a mating connector. As will be described in greater detail herein below, this design is tolerant of substantial lateral misalignment between the two mating connectors while still coupling light between the two mating fibers.

FIG. 1 illustrates two mating connectors 100 and 200, each containing six fibers 101, 102, 103, 104, 105, 106 (in connector 100) and 201, 202, 203, 204, 205, 206 (in connector 200) aligned in a plane. However, this is merely exemplary. The invention may be used in connection with cables and connectors containing any number of optical fibers and in a variety of spatial layouts. Each connector includes a single lens 120, 220, respectively. The first and second lenses 120, 220 are positioned with their front faces 120a, 220a substantially facing each other and with their optical axes substantially parallel to each other. The second lens 220 is positioned to receive light beams from the first plurality of optical fibers 101-106 exiting the front face 120a of the first lens 120 and vice versa.

FIG. 1 illustrates a lens comprising a single curved surface, e.g., a "singlet" lens. This is merely exemplary, as the lenses used in expanded beam connectors may be of several types, including multiple piece lenses. The term single lens as used herein refers to the fact that the light from the multiple optical transports, e.g., optical fibers, pass through the same lens, not that the lens itself is necessary a single piece.

In this exemplary embodiment, the two connectors 100, 200 are optically identical to each other. Therefore, let us discuss the left-hand connector 100 with the knowledge that the other connector 200 is identical.

The lens 120 may be a molded polymer lens. It includes six bores 111, 112, 113, 114, 115, 116 into which one of the fibers 101-106 is inserted. In one embodiment, the diameters of the bores 111-116 are substantially equal to or very slightly larger than the diameters of the fibers 101-106 so that the fibers fit tightly within the bores. In one embodiment, an epoxy 107 having an index of refraction substantially equal to the index of refraction of the lens 120 is injected into the bores 111-116 before the fibers 101-106 are inserted and then the epoxy cured to fix the fibers in the bores. Note that the drawings are not necessarily to scale. For instance, the amount of space provided for the epoxy 107 is exaggerated.

Using an epoxy with an index of refraction substantially equal to the index of refraction of the lens will reduce or eliminate the need to polish the ends of the fibers. Specifically, in conventional optical connectors in which the ends of the fibers are in air or butted against another optical element, the ends of the fibers typically need to be polished extremely smooth to maximize optical throughput. However, with the end faces of the fibers embedded in an epoxy that molds itself to the profile of the end face of the fibers as well as the mating surface of the lens and has a reasonably close index of refraction to that of the fiber and/or the lens, optical losses through the interface should be minimal without the need for polishing the ends of the fibers.

The lens 120 is designed to expand the beam from each fiber 101-106 and collimate the light upon exiting the lens from the front face 120a into the air gap 310 between the two lenses 120, 220. For sake of clarity and simplicity, the beam 131 of only one fiber 101 is shown in FIG. 1. The lens also is designed to direct the collimated beam 131 to an image point 303 diametrically opposite the originating field point 302 about the optical axis 304 of the lens 120, where the front face of the corresponding fiber 201 in the mating connector 200 is located.

Figure 2:
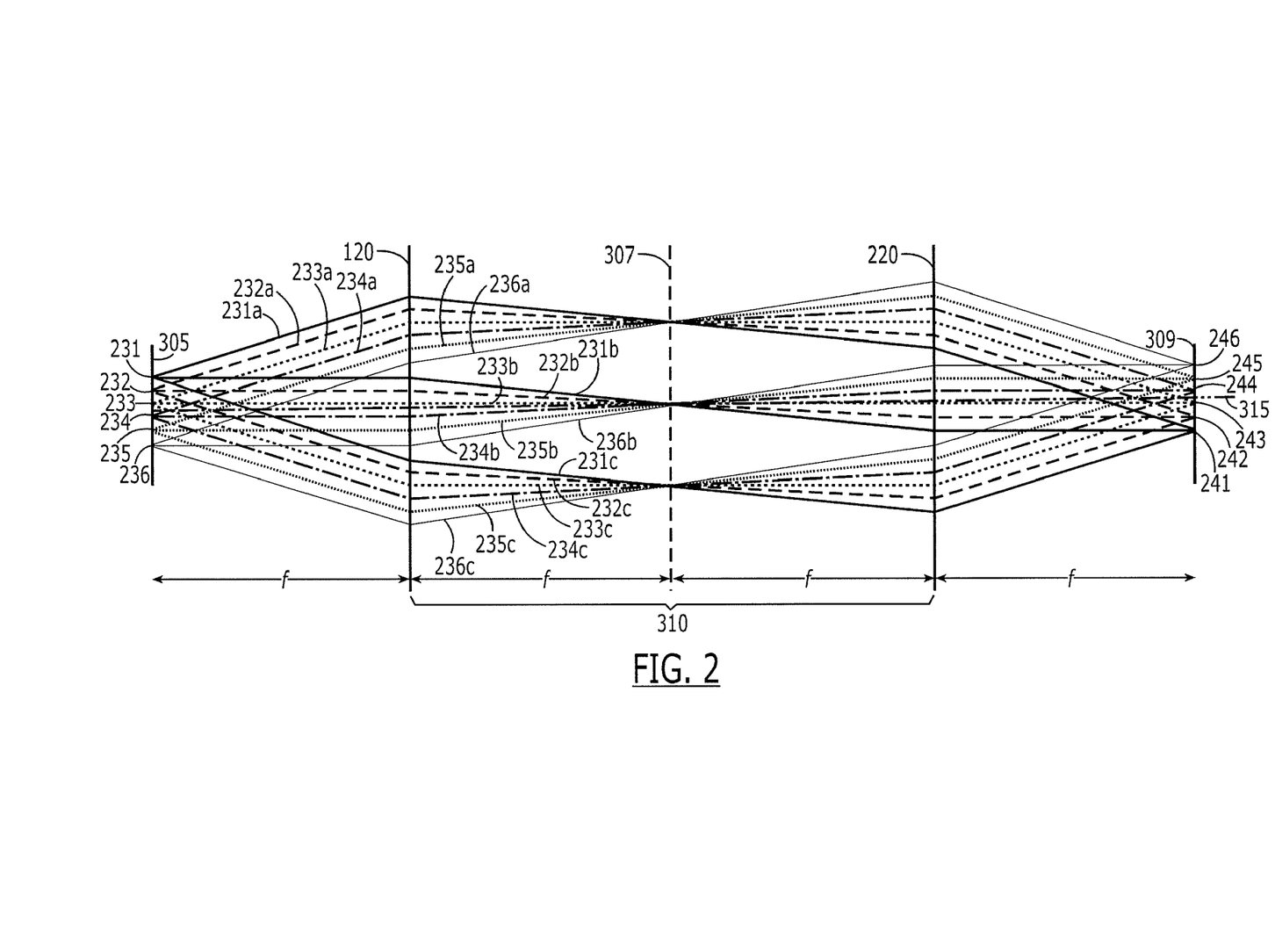
FIG. 2 is a diagram illustrating the light paths through the two mating connectors of FIG. 1 for six idealized exemplary fiber-to-fiber optical couplings.

FIG. 2 is a beam diagram corresponding to the embodiment of FIG. 1 showing exemplary paths of the idealized point sources 231, 232, 233, 234, 235, 236 from all six fibers. The lenses 120, 220 are modeled as idealized, infinitely thin lenses. Three lines are shown for the beam from each point source (e.g., fiber), namely, (1) a first line 231b, 232b, 233b, 234b, 235b, and 236b demonstrative of the path of light at the center of the beam, (2) a second line 231a, 232a, 233a, 234a, 235a, and 236a demonstrative of the path of light at the top-most extent of the beam, and (3) a third line 231c, 232c, 233c, 234c, 235c, and 236c demonstrative of the path of light at the bottom-most extent of the beam.

Line 305 defines the field plane of the six point sources 231, 232, 233, 234, 235, 236 (i.e., the plane defined by the ends of the fibers/beginning of the lens in connector 100). Line 309 defines the plane of the image points 241, 242, 243, 244, 245, 246 (i.e., the front faces of the receiving fibers in connector 200 on which the beams are focused). Finally, line 307 is the midplane of the two connectors. Line 307 does not necessarily correspond to any physical component or interface, but is the centerline or half-way point between the field plane 305 and the image plane 309.

As can be seen in FIG. 2, each beam expands in air for a distance of one focal length, f, to the first lens 120. Then, lens 120 collimates the light so that a collimated beam exits the first lens 120 into air. Then, each beam travels two focal lengths, 2f, through the air gap 310 between the two lenses 120, 220. Finally, each beam enters the second lens 220, which focuses the beam. Over the distance of one more focal length, f, each beam is focused onto the corresponding image point 241, 242, 243, 244, 245, 246 in the image plane 309, i.e., the front face of the corresponding fiber in the second connector 200. The optical system has a magnification of −1. As a result, the image of the array of source fibers is the same size as the array of receiving fibers and flipped diametrically about the optical axes of the lenses 100, 200. The relative orientation of the receiving fibers with respect to the image of the source fibers is determined by the mechanical connector structure, including any keying features that may be used to control the rotation of one connector with respect to the other.

In the example of FIG. 2, the optical axes of the two lenses are perfectly aligned on axis 315. However, as described in more detail in aforementioned U.S. patent application Ser. No. 12/836,067 the optics of two opposing collimating lenses 120, 220 are such that, even if the optical axes of the two lenses are significantly offset from each other, the location of the image points 241-246 will remain unchanged relative to the front of the receiving lens 200 in the direction transverse the optical axis of the lens 200 as long as the light is collimated and enters the front of the lens 220. Rather, the angle at which the light impinges upon the image points will be changed. (Note that the image points also will remain unchanged in the longitudinal direction since the longitudinal location of the image points is dictated by the focal length of the lens).

Thus, by using a single lens to expand and collimate the light from all of the fibers in the connector, the connector system is substantially insensitive to lateral misalignment of the fibers. Hence, the connectors and ferrule alignment systems need not be manufactured to as precise tolerances as might otherwise be required of more conventional connector designs. As long as each lens is precisely laterally aligned with the fibers in its own connector (i.e., the lateral position of lens 120 relative to fibers 101-106 in connector 100 is the same as the lateral position of lens 220 relative to the fibers 201-206 in connector 200), the two connectors 100, 200 themselves can be substantially misaligned laterally with no ill effect.

Thus, as long as the angle at which the light enters the receiving lens is well within the numerical aperture of the fibers, the vast majority of the light will still enter the fibers.

Figure 3A:
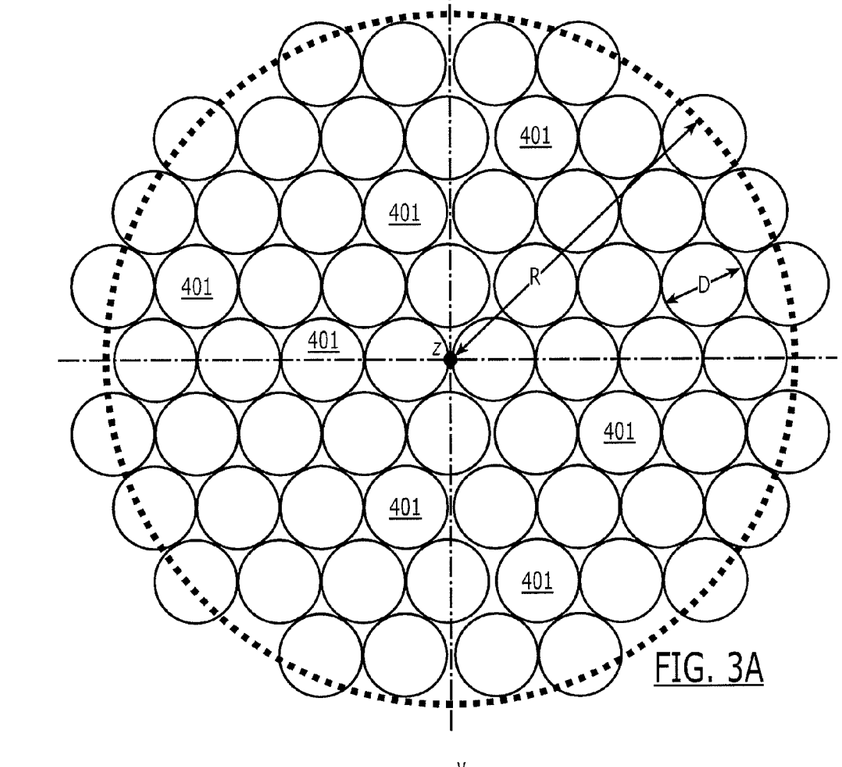
FIG. 3A is a front plan view of the optical fibers in a fiber optic cable packed in a regular hexagonal packed arrangement.

It is not uncommon for a fiber optic cable to contain a very large number of optical fibers, such as 64 or more. Hence, the single lens in the connector may need to be relatively large. Larger lenses are more difficult to manufacture. Furthermore, the optical quality typically is greater near the center of a lens than near its periphery. Accordingly, it is preferable to arrange the end faces of the optical fibers so that the fibers are packed as closely together as possible for interfacing to the lens. FIG. 3A is a front plan view of a regular hexagonally packed set of 64 cylindrical fibers as viewed at the front faces of the fibers. In a regular hexagonal packed arrangement, the outer circumference of each fiber 401 (except the diametrically outermost layer of fibers and a few of the next outermost layer of fibers) is in point contact with each of six of the surrounding fibers. This allows 64 fibers to be packaged within a radius, R, that is about 4.09 times the fiber diameter, D. Also, note that the geometric center of the 64 fibers (on the z axis depicted in FIG. 3A) is between fibers. Other arrangements are possible, including arrangements in which the geometric center of the collection of fiber end faces is at the center of a central fiber. Whatever packing arrangement is selected, it preferably is symmetrical about the x and y axes because the field points are to be imaged about the optical axis (i.e., z axis). Regular hexagonal packing is one arrangement, but it is merely exemplary. Generally, it will be desirable, although not required, to pack the fibers in an arrangement that minimizes the maximum radial distance R from the optical axis of the lens to the outermost fiber. The most efficient packing arrangement may vary depending on the number of fibers to be packed. Furthermore, there may be several options for any given number of fibers.

A regular hexagonally packed fiber array is symmetric about the geometric center. It also is rotationally symmetric about a 180° rotation around its geometric center axis (the z axis in FIG. 3A). That is, if the bundle were rotated 180° about the z axis in FIG. 3A, it would look exactly the same as in FIG. 3A. Thus, two mating hermaphroditic connectors employing a regular hexagonal packed fiber bundle could mate properly with one hermaphroditic connector rotated 180° relative to the other with the beam from each fiber in the first connector imaging to a fiber in the second connector. On the other hand, a regular hexagonally packed fiber array as shown in FIG. 3A is not rotationally symmetric about a 90° rotation around its geometric center axis (the z axis in FIG. 3A). That is, if the bundle were rotated 90° about the z axis in FIG. 3A, it would look different than FIG. 3A. Accordingly, two mating hermaphroditic connectors employing a regular hexagonal packed fiber bundle would not mate properly with one hermaphroditic connector rotated 90° relative to the other.

Figure 3B:
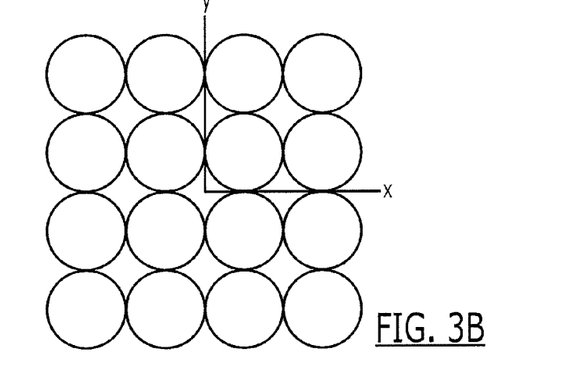
FIG. 3B is a front plan view of the optical fibers in a fiber optic cable in a square packed arrangement.

FIG. 3B is a front plan view of a square packed set of 16 cylindrical fibers as viewed at the front faces of the fibers. This type of packing arrangement may not be as efficient as the regular hexagonally packed fiber bundle shown in FIG. 3A in terms of minimizing the distance of the farthest fibers from the geometric center of the bundle, but it also is symmetric about the geometric center z of the bundle. It also is rotationally symmetric about a 90° rotation, a 180° rotation, and a 270° (or −90°) rotation around its geometric center axis, z. That is, if the bundle were rotated either −90°, 90° or 180° about the z axis in FIG. 3B, it would look exactly the same. Thus, two mating hermaphroditic connectors employing a regular hexagonal packed fiber bundle could mate properly with one hermaphroditic connector rotated −90°, 90°, or 180° relative to the other with the beam from each fiber in the first connector imaging to a fiber in the second connector.

As previously mentioned, when two optical connectors are mated, the fibers in the first connector must be laterally aligned (i.e., in the x-y plane in FIGS. 3A and 3B, for instance) so that the light beam from each fiber in the first connector is received by a corresponding fiber in the second connector. Also as previously mentioned, the single lens concept of aforementioned Ser. No. 12/836,067 allows such optical coupling between mating fibers in two mated connectors even when there is significant lateral misalignment between the lenses of the two connectors. However, this arrangement still requires precise alignment of the optical axes of the two lenses parallel to each other (hereinafter "axial alignment"). Furthermore, the fibers in the two connectors still must be properly rotationally oriented about their optical axes relative to each other (hereinafter "rotational alignment"). Thus, rotational alignment is akin to roll angle, whereas axial alignment is akin to pitch and/or yaw angles, collectively. Particularly, in the connector of FIGS. 1 and 2 illustrated above, each beam is imaged diametrically opposite the optical axes of the lenses. Therefore, a fiber in the receiving connector needs to be in that diametrically opposite position to receive the light beam emanating from the corresponding sending fiber. The cores of optical fibers, which carry the light, are very small in diameter as compared, for instance, to the diameter of the overall fiber bundle in FIGS. 3A and 3B such that it would take very little rotational misalignment between two lenses for the diametrically outermost fibers to become substantially misaligned.

Figure 4A:
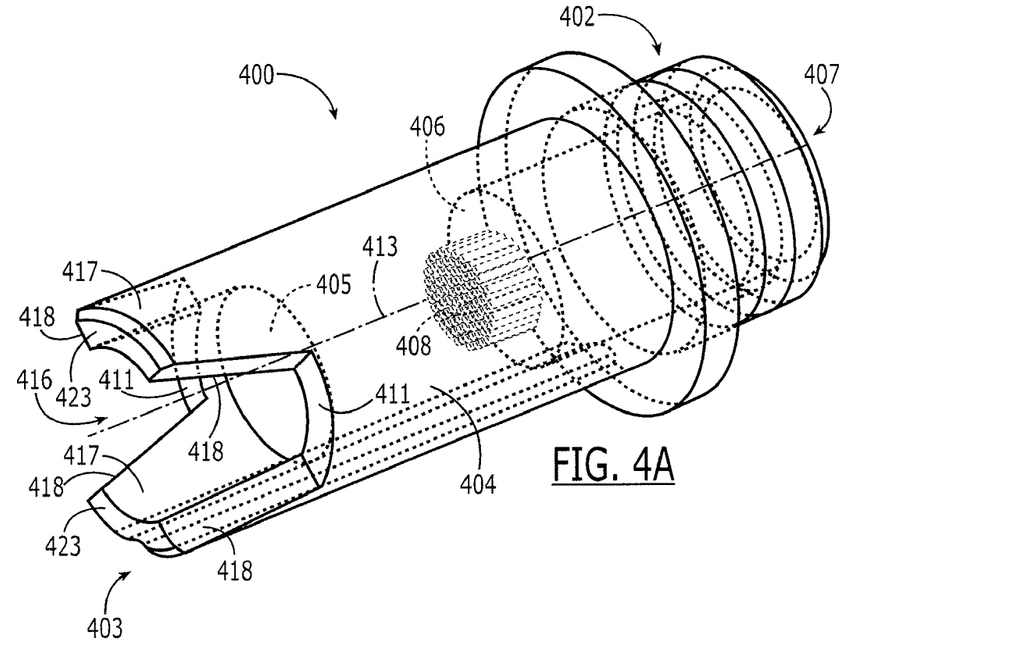
FIG. 4A is a perspective view of a lens for an optical connector in accordance with a first embodiment of the invention.

FIG. 4A illustrates a lens that can be utilized as the single lens for all of the fibers in a multi-fiber connector, the lens incorporating a keying arrangement comprising a rotational alignment feature that precisely rotationally aligns the lens to an identical lens so that the fibers in two mating connectors will be properly aligned. Particularly, the lens 400 is generally cylindrical, having an outer diametric surface 404. The lens 400 further includes a rear end 402 and a front end 403. The front optical face 405 of the lens is spaced from the front physical end 403 of the lens. The rear portion 402 of the lens 400 includes a longitudinal bore 407 from the rear end 402 to a face 406 within the lens 400. Within face 406 are smaller longitudinal bores 408, each for accepting a fiber as previously discussed. A press-in crimp ring (not shown) may be inserted into the rear bore 407 for holding the bundle of fibers together.

Figure 4B:
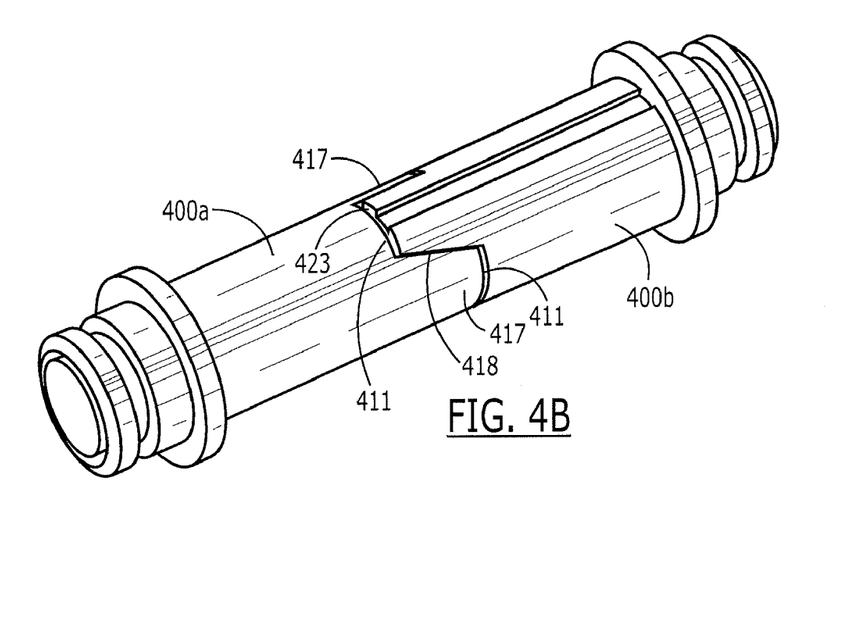
FIG. 4B is a perspective view of two lenses in accordance with the embodiment of FIG. 4A shown mated together in accordance with the principles of the invention.

The front portion 403 of the lens 400 includes a lateral face 411 oriented generally laterally to the longitudinal axis (i.e., the optical axis 413) of the lens. The front optical face 405 is recessed from the lateral face 411, but this is not a requirement in general. Extending longitudinally forward from the lateral face 411 are two identical rotational alignment features. In this embodiment, the alignment features are diametrically opposed (about the optical axis 413) protrusions in the form of circumferential walls 417 extending longitudinally forwardly. Each wall 417 has two opposing sloped faces 418. Faces 418 are oriented to have a major directional component in the longitudinal direction 413, but preferably are sloped, i.e., have a component such that each wall 417 is wider at its base (longitudinally towards the longitudinal center of the lens) than at its end (longitudinally toward the front end 403 of the lens). Each wall also has a front end face 423. Thus, the two walls 417 define two open circumferential spaces 416 between the two walls 417. The walls 417 are sized and shaped so that the two spaces 416 are identical to each other and are substantially identical in size and shape to the walls 417. In this manner, a second lens identical to this lens can be mated to this lens with the front ends 403 of the two lenses facing each other (as they would in an optical connector), wherein the walls 417 of that second lens will fit precisely within the spaces 416 of the first lens and the walls 417 of the first lens will fit precisely within the spaces 416 of the second lens with the sloped side faces 418 of the walls of the first lens in planar contact with the sloped side faces 418 of the second lens, as shown in FIG. 4B, which shows two such lenses 400a, 400b mated together as discussed. The protrusions and mating spaces may take other forms, such as pins and mating holes.

Preferably, as shown in FIG. 4B, the angles of the side faces 418 of the walls 417 and their overall lengths, L, are selected such that, when two lenses 400a, 400b are mated as just described, the sloped faces 418 will achieve planar contact with each other and prevent further insertion of the two lenses longitudinally toward each other before the lateral faces 411 of each lens contact the lateral faces 423 of the other lens. This is because it is the planar mating of the side faces 418 of walls 417 of the two lenses 400a, 400b that serves to align the two lenses to each other in a particular rotational orientation relative to each other. The mating of faces 418 also serves to help axially align the lenses with their optical axes parallel to each other. Preferably, the edges of the two connectors that meet in planar contact are (1) oriented substantially or fully longitudinally and have a substantial length. The longer the two mating surfaces are and/or the closer to parallel they are to the optical axis of the lenses, the more accurately they will axially align the two lenses with their optical axes parallel (in addition to the rotational alignment).

It should be apparent that two identical lenses 400 mated as described above can be mated in two possible rotational orientations relative to each other. Particularly, if we consider the first lens 400a shown in FIG. 4B to be oriented at 0 degrees rotation about its optical axis, then the second lens 400b can be mated to the first lens if it is oriented at 90 degrees or −90 degrees about its optical axis so that its two walls 417 will fit into the two spaces 416 in the first connector 400a. That is, since there are two identical walls and two identical spaces per connector, there are two orientations in which the two lenses may be coupled as indicated. As noted above, a square packed bundle of fibers is symmetric at every 90 degrees of relative rotation about its longitudinal axis. Thus, if the fibers connected to the lenses in this embodiment are square packed as shown in FIG. 3B (or any other packing arrangement that is symmetric at 0 degrees, 90 degrees and −90 degrees), then two identical connectors can be mated and automatically rotationally aligned to each other using this embodiment and there will be a properly positioned receiving fiber in each connector for each fiber in the other connector.

However, for fiber packing arrangements that are not 90 degree rotationally symmetric, such as the regular hexagonal packing arrangement of FIG. 3A, the two fiber bundles of any two mating connectors would have to be different from each other (i.e., not hermaphroditic) in order for the particular embodiment of FIGS. 4A and 4B to allow every fiber in one connector to optically couple to a fiber in the other connector at 90 and −90 degrees relative rotation. This is not necessarily problematic insofar as there are many commonly used optical connector design in use today where two mating connectors are not identical (e.g., any connector standard that has male and female connector pairs).

Figure 5A:
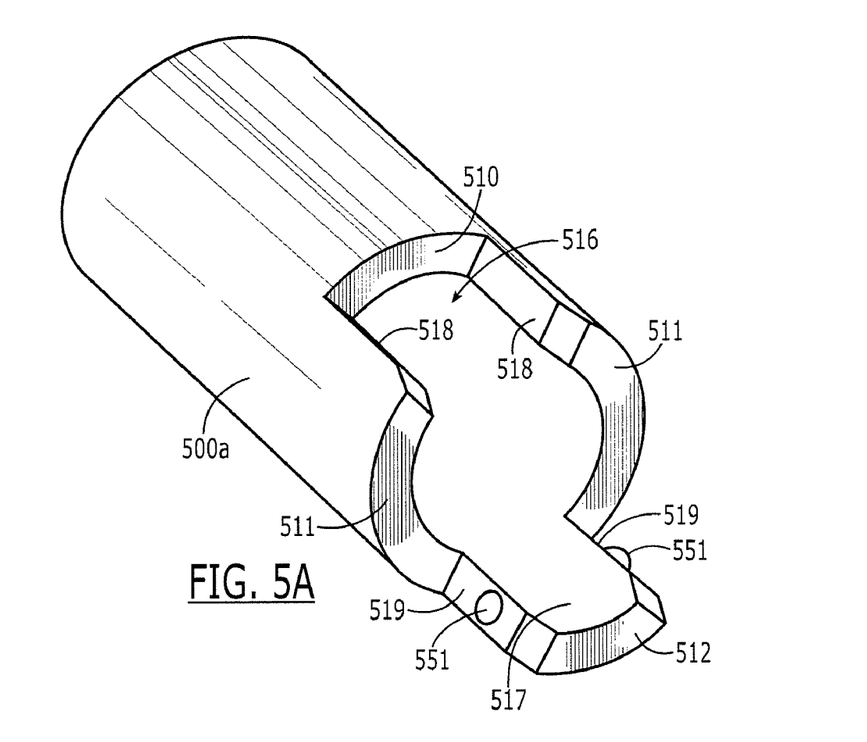
FIG. 5A is a perspective view of a lens for an optical connector in accordance with a second embodiment of the invention.
Figure 5B:
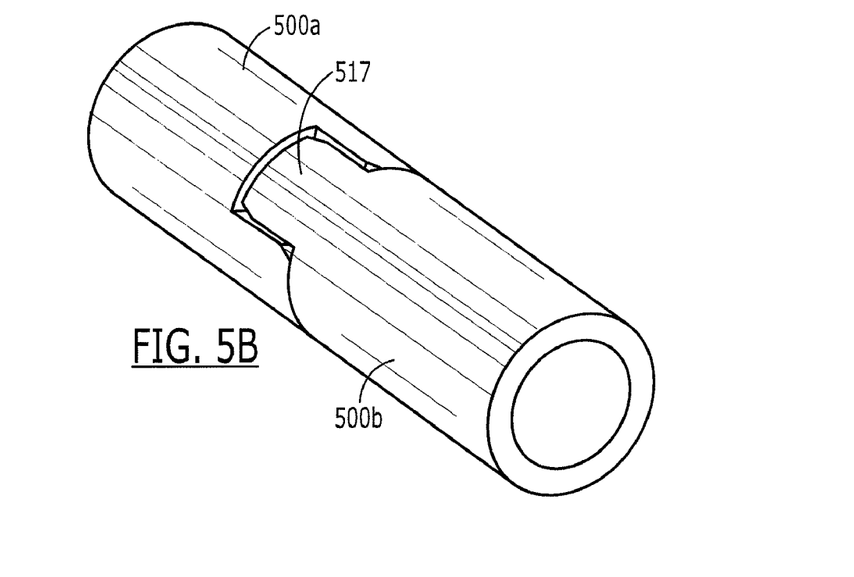
FIG. 5B is a perspective view of two lenses in accordance with the embodiment of FIG. 5A shown mated together in accordance with the principles of the invention.

However, the mating alignment features of the embodiment of FIGS. 4A and 4B are merely exemplary and other such alignment features that provide different relative rotational alignments may be used instead. Another option, for instance, is illustrated in FIGS. 5A and 5B. This embodiment is similar in some respects to the embodiment of FIGS. 4A and 4B. One significant distinction is that the alignment features 516, 517 of these lenses 500a, 500b permits coupling of two identical facing lenses in only one relative rotational orientation, namely, 180 degrees rotated relative to each other. This embodiment, for instance, would allow hermaphroditic mating of two identical lenses bearing regular hexagonally packed fiber bundles such as illustrated in FIG. 3A, which are symmetric about 180 degrees of rotation. It also would work for the square packed arrangement of FIG. 3B, which also is symmetric about 180 degrees rotation (as well as 90 and −90 degrees).

Particularly, in the lens design shown in FIG. 5, each lens 500a, 500b has three lateral faces herein termed rear lateral face 510, mid lateral face 511 (comprised of two coplanar parts), and front lateral face 512 and a circumferential partial wall 517 extending longitudinally outwardly therefrom and a complementarily shaped circumferential recess 516 extending longitudinally inwardly from the lateral face 511 (i.e., shaped to accept snugly therein the wall 517 of a facing lens so that the side edges of the wall achieve planar contact with the side edges of the recess). The partial wall 517 and the space 516 are diametrically opposed to each other about the optical axis of the lens.

In this way, two identical facing lenses will mate with the wall 517 of each lens 500a, 500b extending snugly into the recess 516 of the other. This occurs only when the two lenses 500a, 500b are rotationally oriented 180 degrees differently from each other.

The keying structures of the hermaphroditic lenses in FIGS. 5A and 5B also differ from the lenses in 4A and 4B in other ways, in order to demonstrate some additional options for accurately rotationally aligning the two lenses. For instance, in the embodiment of FIGS. 4A and 4B, the surfaces 418 are sloped, and control both the rotational alignment and the longitudinal separation of the lenses. In contrast, in the embodiment of FIGS. 5A and 5B, the surfaces 518 and 519 (loosely corresponding to surfaces 418 of the embodiment of FIGS. 4A and 4B) do not have a slope (they are parallel to the optical axis of the lens), and the longitudinal separation of the optical faces of the lenses is controlled by the two flat mid lateral surfaces 511, which are allowed to contact each other. The other lateral surfaces 510 and 512 also can be allowed to contact each other (but are non-contacting in this particular embodiment). Such mating lateral surfaces can also serve to help axially align the two lenses with their optical axes parallel to each other. Furthermore, a precise rotational fit is achieved by adding features such as the bumps 551, which provide an interference fit with the walls 518 of the lens of the mating connector with minimal frictional drag.

The alignment features at the front ends of the lenses shown in FIGS. 4A and 4B and 5A and 5B are merely exemplary. The shape, size, and number of keying features can take many other forms than those shown in the drawings, as long as they will cause two facing lenses to mate in one or a limited number of predetermined rotational orientations about their optical axes relative to each other (and those rotational orientations correspond to a rotational symmetry of the fiber packing arrangement of the fibers coupled through the two lenses). Although, as noted above, rotational symmetry is not necessary if the fibers in the two connectors are packed differently from each other so as to provide a receiving fiber in the correct position for each transmitting fiber.

Figure 6:
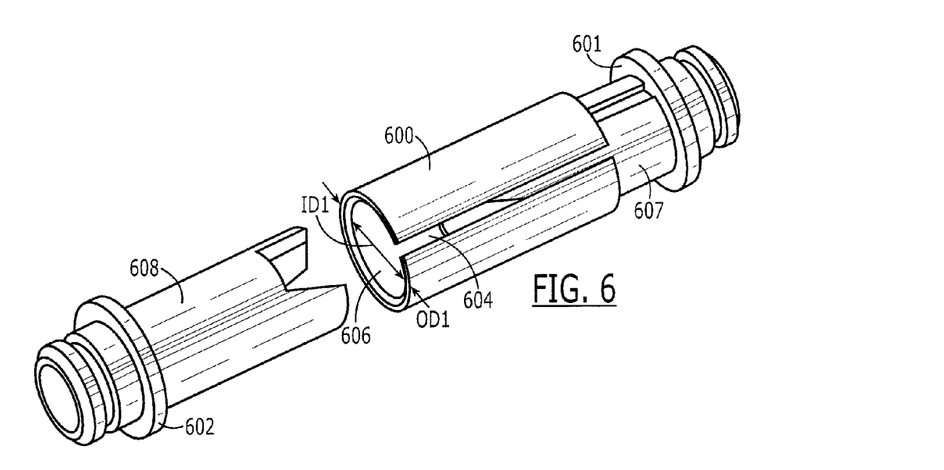
FIG. 6 is a perspective view of at least a portion of an optical connector assembly in accordance with a second aspect of the invention in a partially assembled condition.

However, even more precise axial alignment can be achieved by further including in the connection mechanism a longitudinally oriented surface that simultaneously engages the outer diameter of both lenses over a substantial amount of their lengths. This is illustrated in FIG. 6. Particularly, a hollow member having a circumference in the form of sleeve 600 having an inner diameter, ID1, substantially equal to the outer diameters of the lenses is slipped over the two lenses 601, 602 that are to be mated in a connector. The sleeve 600 may be a resilient split sleeve (see split 604) with a diameter that is actually smaller than the outer diameters of the lenses when unstressed. The sleeve 600 can expand radially to accommodate the lenses, thereby assuring that the inner diametrical surface 606 of the sleeve 600 makes good contact with the outer diametrical surfaces 607, 608, respectively, of both lenses 601, 602.

Furthermore, the sleeve should be long enough in the longitudinal direction so that it can make contact with the lenses over a substantial portion of the length of each lens. Particularly, the longer the area of contact with either lens 601, 602, the more accurately that lens will be axially aligned with the longitudinal axis of the sleeve (and thus the other lens also). The length of the contact between the sleeve and each lens that will be sufficient for any given application will vary based upon the application. For applications with very low tolerances, the length of contact preferably is at least 400% of the diameter of the lenses (with approximately half of the length of the sleeve contacting each lens). More preferably, the sleeve length is at least 800%, and even more preferably, at least 1200% of the lens diameters. The desire to maximize the length of this contact, of course, should be weighed against the desire to limit the overall length of the connection assembly. Alternately, if mating lateral surfaces of the lens are used to control the axial alignment of the optical axes of the lenses parallel to each other, then the outer circumference (e.g., diameter) of that surface preferably should be at least 300% of the focal length of the lenses. More preferable, the outer circumference is at least 600%, and even more preferably, at least 1200% of the focal length of the lenses.

The lenses and/or the sleeve may be provided with tapered lead-ins at its longitudinal ends so that the lenses can be easily inserted therein.

In a practical implementation of the invention, the lenses and sleeve would be housed within a connector housing that helps guide the two lenses into proper engagement and, with the two lenses engaged in the proper rotational alignment and axial alignment, releasably holds the two connectors together. Any form of connector housing with a releasable latch for locking the two connectors together and that accommodates the alignment sleeve and lenses would be acceptable. As noted above, the lenses may be incorporated in a housing which may or may not be cylindrical, and which may be used to mate many different kinds of elements, such as a board to a backplane, a board to a midplane, a board to a board in a co-planar, parallel, or orthogonal orientation, a plug to a plug, and plug to bulkhead (i.e., panel mount).

Figure 7A:
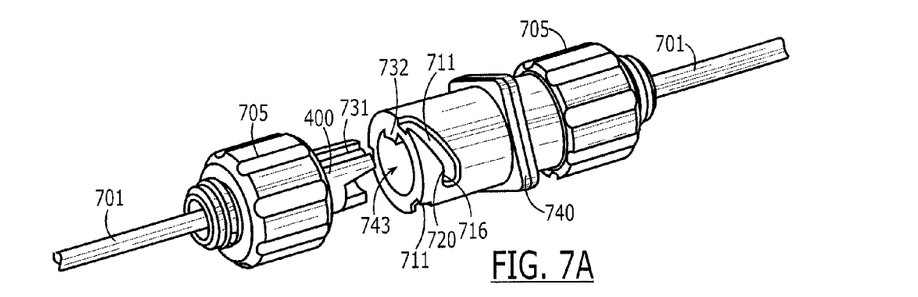
FIG. 7A is a perspective view of an optical connector assembly in accordance with an embodiment of the invention in a partially assembled condition.
Figure 7B:
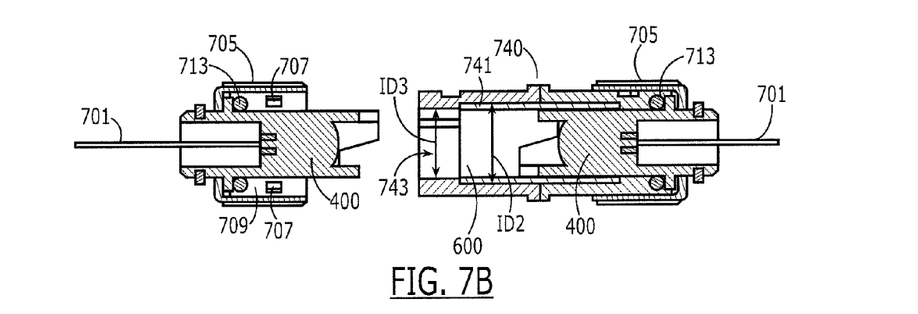
FIG. 7B is a cross sectional view of the optical connector assembly of FIG. 7A.

FIGS. 7A and 7B illustrate one such exemplary connector housing. FIGS. 7A and 7B show an assembly comprising two cables with coupling nuts at their ends being joined via a distinct connector housing. This is merely exemplary. In other embodiments, the components of the connector housing may be integral with one of the cable/coupling nut assemblies. FIG. 7A is a perspective view thereof and FIG. 7B is a cross-sectional side view of the same showing the internal parts.

In this embodiment, each cable 701 is terminated with a lens in accordance with the invention, such as lens 400 of FIGS. 4A and 4B, and a bayonet style nut connector 705. For instance, each nut connector 705 has two or more pins 707 protruding radially inwardly from the inner diametrical surface 709 of the nut connector 705. Each nut connector 705 further includes a resilient O-ring 713 inside it near its rear end that seals the lens 400 to the alignment housing 740. The O-rings also provide a resilient longitudinal resistance against the alignment housing 740 when it is inserted into the interior of the coupling nut 705 and into contact with the O-ring 713. As is also well known in the connector art and as will be discussed in more detail below, this resistance provides a longitudinal resistance that helps keep the pins 707 engaged in the detents 716 at the ends of grooves 711 of the alignment housing 740. The nuts 705 can rotate about their longitudinal axes relative to the lenses and cables so that they can be twisted (for purposes of engaging the pins 707 of nuts 705 with the grooves 711 of the alignment housing 740 in traditional bayonet coupling style) without also twisting the lenses, which as described in detail above, need to join in precise rotational orientation relative to each other.

The alignment housing 740 essentially is a straight tube having a recess 741 in its inner wall for receiving the alignment sleeve 600. The length of the recess 741 may be slightly longer than the length of the sleeve 600 to allow it to move longitudinally or it may be precisely the same length as the alignment sleeve so that the alignment sleeve fits snugly within the recess 741 Furthermore, the inner diameter ID2 of the alignment housing 740 at the recess 741 is greater than the outer diameter OD1 of the alignment sleeve 600 (see FIG. 6) when unstressed and equal to or slightly greater than the outer diameter that the sleeve will have when it has radially expanded to accept the lenses 400 therein as discussed in connection with FIG. 6 so that the sleeve 600 can expand within the recess 741. The inner diameter of the remainder of the alignment housing ID3 is slightly smaller than the outer diameter OD1 of the alignment sleeve 600 when in an unstressed condition so that the sleeve 600 is always longitudinally trapped within the groove 741.

The outer diametrical surface of the alignment housing 740 bears two or more contoured grooves 711 at each of the opposing longitudinal ends thereof for accepting therein the pin 707 of the coupling nuts 705 in conventional bayonet style connection. In use, each cable 701 is inserted onto an opposite longitudinal end of the alignment housing 740 with the lens 400 going inside the internal bore 743 of the alignment housing and the coupling nut 705 surrounding the alignment housing 740. As is well known in the industry, the pins 707 would enter the ends of the grooves 711 that are open to the longitudinal ends of the housing 740 and, by twisting of the nuts 705 in one direction relative to the alignment housing 740, the pins 707 ride in the grooves until they reach the other, closed end of the grooves 711. The grooves are contoured so that this riding of the pins 707 in the grooves 711 causes the alignment housing 740 to be drawn longitudinally into the respective coupling nut 705 until the respective longitudinal end of the alignment housing contacts the O-ring, which provides some resistance to further longitudinal insertion. The housing is designed so that the longitudinal end of the alignment housing contacts the O-ring 713 slightly before the pin reaches a lip 720 of a detent 716 at the closed end of the respective groove 711, in which detent the alignment housing 740 is allowed to slightly retreat longitudinally in response to the resistance provided by the O-ring 713. The lip and detent causes the pin 707 to become locked in the detent portion 716 of the groove so that the pin 707 can be released from the detent portion 716 of the groove 711 only by twisting back in the other direction with sufficient force to overcome the longitudinal resistance provided by the O-ring to the further insertion of the alignment housing into the nut, thus providing a releasable locking of the respective nut 705 to the alignment housing 740.

Preferably, the lenses 400 and alignment housing 740 include a second keying arrangement (separate from the above-described rotational alignment features 417 of the two mating lenses 400) to coarsely rotationally align each lens 400 with the alignment housing 740 and, consequently, coarsely rotationally align the two mating lenses with each other. Specifically, in the illustrated embodiment, each lens 400 further includes a longitudinal slot 731 on its outer surface. The alignment housing 740 includes a corresponding longitudinal protrusion 732 that can slide longitudinally within the slot 731 of the corresponding lens 400. The slot 731 and protrusion 732 are seen only for one of the lenses 400 (the left-hand one) in the views of FIGS. 7A and 7B. However, it should be understood that there is a corresponding slot on the other lens and a corresponding protrusion at the other longitudinal end of the alignment housing. The two protrusions 732 on the alignment housing preferably are rotationally offset from each other by 90° in this embodiment for reasons that will become clear in the discussion below.

The position of the grooves 711, the length of the alignment housing 740, and the length of the rotational alignment features 417 of the lenses should be collectively chosen so that (1) the protrusion 732 enters the slot 731 and (2) the alignment wall(s) 417 of one of the lenses 400 at least starts to enter the corresponding recess(es) 416 of the other lens 400 within the alignment housing 740 (i.e., the alignment wall(s) of one lens is partially longitudinally coextensive with the alignment wall(s) of the other lens) while the pins 707 of at least one of the nuts 705 is still outside of the respective grooves 711 on the alignment housing. This keying arrangement is provided so that at least one of the lenses 400 can be coarsely rotationally aligned with the alignment housing 740 without interference from the engagement of the coupling nut with the alignment housing. This coarse rotational alignment is desirable to prevent the end faces 423 of the two lenses 400 from initially abutting each other, as this would prevent the two lenses from mating with the side faces 418 of the alignment walls 417 in planar contact with each other. Specifically, once any portion of the alignment wall(s) 417 of the two lenses are longitudinally coextensive, any further longitudinal insertion will automatically cause the two lenses 400 to become properly rotationally aligned. However, before the respective wall(s) 417 and recess(s) 416 become at least partially longitudinally coextensive, the end faces 423 of the walls 417 of the two lenses 400 could abut each other and the friction there between could prevent the two lenses 400 from being able to rotate relative to each other such that the alignment wall(s) 417 could not even enter the alignment recess(es) 416 of the other. Thus, in this particular embodiment for the lenses 400 of the FIGS. 4A and 4B embodiment, the two protrusions 732 on the alignment housing should be rotationally offset from each other by 90° so that the walls 417 of each lens 400 will be coarsely rotationally aligned with the recesses 416 of the other lens 400.

Note, that, if the alignment housing were designed to work with the lenses of the FIGS. 5A and 5B embodiment, for example, the protrusions should be rotationally offset from each other by 180° instead of 90°. Also note that, this keying arrangement also could be used to assure only one rotational alignment choice for two mating lenses, even if the lenses themselves permit multiple potential rotational alignment choices, such as the lenses 400 of FIGS. 4A and 4B, which, as noted above, permit two potential rotational alignment choices, namely, −90° and 90°. This may be desirable to allow the use of fiber bundling arrangements that do not provide the rotational symmetry discussed above in connection with FIGS. 3A and 3B in all of the rotational alignments permitted by the rotational alignment features of the lenses themselves. Specifically, the keying arrangement between the alignment housing and the lenses can be used to assure that the two lenses can be mated in only one of the otherwise multiple potential rotational orientations relative to each other.

This keying arrangement should still allow for some rotational play between the two lenses so that the fine rotational alignment described herein above may be achieved by mating side 418 of walls 417 of the two lenses 400. Thus, as described above, the width of the protrusion 732 is less than the width of the slot 731 so that some rotation of the two lenses relative to the alignment housing (and consequently to each other) is allowed.

The position of the grooves 711, the length of the alignment housing 740, and the length of the alignment features of the lenses also should be collectively chosen so that, when the pins are firmly seated in the detent portions of the grooves, the mating side faces of the alignment walls and recesses of the lenses that are suppose to mate in planar contact to provide the proper rotational alignment of the two lenses are, in fact, in mating, planar contact under force, but not enough to significantly distort the lenses.

Furthermore, the alignment housing 740 and alignment sleeve 600 should be dimensioned so that when the lenses are within the alignment sleeve 600, a substantial length portion of the outer diameter of each lens is in contact with the inner diameter of the alignment sleeve 600, thereby providing axial alignment of the two lenses.

The keying arrangement alternately may be incorporated into the alignment sleeve 600 itself.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A lens for coupling a beam from each optical fiber of a first plurality of optical fibers to a corresponding optical fiber of a second plurality of optical fibers comprising:
   a front end, a rear end, and a longitudinal body therebetween;
   a front optical face substantially perpendicular to a longitudinal axis of the lens;
   a rotational alignment feature extending longitudinally forward of the front optical face, the alignment feature comprising at least one protrusion and at least one open space, the protrusion and space being substantially complementary in shape and size so that first and second such lenses can be mated facing each other with the protrusion of the first lens extending into the space of the second lens such that the first and second lenses can be so mated in a limited number of rotational orientations about their longitudinal axes.

2. The lens of claim 1 wherein the at least one protrusion comprises a wall including two side faces that will mate in planar contact with the two side faces of an identical lens when first and second such lenses are mated facing each other.

3. The lens of claim 2 wherein the complementary wall and space comprise two walls and spaces such that two such lenses can be mated facing each other with the walls of one such lens extending into the spaces of the other such lens in only two rotational orientations relative to each other.

4. The lens of claim 1 wherein the complementary wall and space are designed such that two such lenses can be mated facing each other with the wall of one such lens extending into the space of the other in only one rotational orientation relative to each other.

5. The lens of claim 1 wherein the protrusion has a base longitudinally inward of the lens and an end longitudinally outward of the lens and the at least two side faces are oriented at a slope to the longitudinal axis of the lens such that the base of the protrusion is larger than the top of the protrusion.

6. The lens of claim 5 wherein the lens is substantially cylindrical and the protrusion is a circumferential wall.

7. A system for optically coupling a first plurality of optical fibers to a second plurality of optical fibers comprising:
   a first lens coupled to the ends of the first plurality of optical fibers, the first lens having a first optical axis and a first circumference transverse the optical axis;
   a second lens coupled to the ends of the second plurality of fibers, the second lens having a second optical axis and a second circumference transverse the optical axis equal in size to the first circumference;
   an alignment device comprising an alignment sleeve, the alignment sleeve defining a radially expandable hollow member having an inner circumference smaller than the first circumference when in an unstressed condition, but expandable under radial expansion force to a larger inner circumference at least equal to the first circumference, and having a length transverse the inner circumference, whereby the first and second lenses may be inserted into first and second opposing longitudinal ends of the alignment sleeve to thereby align the optical axes of the first and second lenses parallel to each other.

8. The system of claim 7 wherein the first and second lenses are cylindrical such that their circumferences are circular and wherein the alignment sleeve is an annular cylinder.

9. The system of claim 7 wherein the alignment sleeve is a split sleeve.

10. The system of claim 7 wherein the first and second lenses are cylindrical and have equal diameters perpendicular to their optical axes, and wherein the length of the alignment sleeve is at least 400% of the diameters of the first and second lenses.

11. The system of claim 10 wherein the length of the alignment sleeve is at least 800% of the diameters of the first and second lenses.

12. The system of claim 7 further comprising a keying arrangement between the alignment device and each of the first and second lenses for coarsely rotationally aligning the first and second lenses within the alignment device such that the first lens may be inserted into a first longitudinal end of the alignment device in only a first, limited angular range of rotational orientation and the second lens may be inserted into the second longitudinal end of the alignment sleeve in only a second, limited angular range of rotational orientation.

13. The system of claim 12 wherein each keying arrangement comprises one of a longitudinal slot and a longitudinal protrusion disposed on the alignment device adjacent a longitudinal end of the alignment device, and the other of the longitudinal slot and longitudinal protrusion disposed on the respective lens.

14. The system of claim 12 wherein the alignment device further comprises a housing, the alignment sleeve being disposed within the housing, and wherein the keying arrangement is disposed on the housing.

15. The system of claim 7 wherein the alignment device further comprises a housing, the housing defining an inner circumferential surface including a recess within which the alignment sleeve is trapped.

16. The system of claim 7 wherein each lens includes a front end, a rear end and a longitudinal body therebetween, a front optical face substantially perpendicular to a longitudinal axis of the lens, and a rotational alignment feature extending longitudinally forward of the front optical face, the alignment feature comprising at least one protrusion and at least one open space, the protrusion and space being substantially complementary in shape and size so that the first and second lenses can be mated facing each other with the protrusion of the first lens extending into the space of the second lens such that the first and second lenses can be so mated in a limited number of rotational orientations about their longitudinal axes.

17. The system of claim 16 wherein the at least one protrusion of each lens is a wall including two side faces that will mate in planar contact with the two side faces of the other of each lens when the first and second lenses are mated facing each other.

18. The system of claim 16 wherein the protrusion has a base longitudinally inward of the lens and an end longitudinally outward of the lens, and the at least two side faces are oriented at a slope to the longitudinal axis of the lens such that the base of the protrusion is larger than the end of the protrusion.

19. The system of claim 16 further comprising a keying arrangement between the alignment device and each of the first and second lenses for coarsely rotationally aligning the first and second lenses within the alignment device such that the first lens may be inserted into a first longitudinal end of the alignment device in a first, limited angular range of rotational orientation and the second lens may be inserted into the second longitudinal end of the alignment sleeve in a second, limited angular range of rotational orientation.

20. The system of claim 19 wherein each keying arrangement comprises one of a longitudinal slot and a longitudinal protrusion disposed on the alignment device adjacent a longitudinal end of the alignment device, and the other of the longitudinal slot and longitudinal protrusion disposed on the respective lens.

* * * * *